Sept. 20, 1966  O. J. FLOREN  3,273,879
COMPOUND SINE PLATE
Filed Sept. 13, 1963
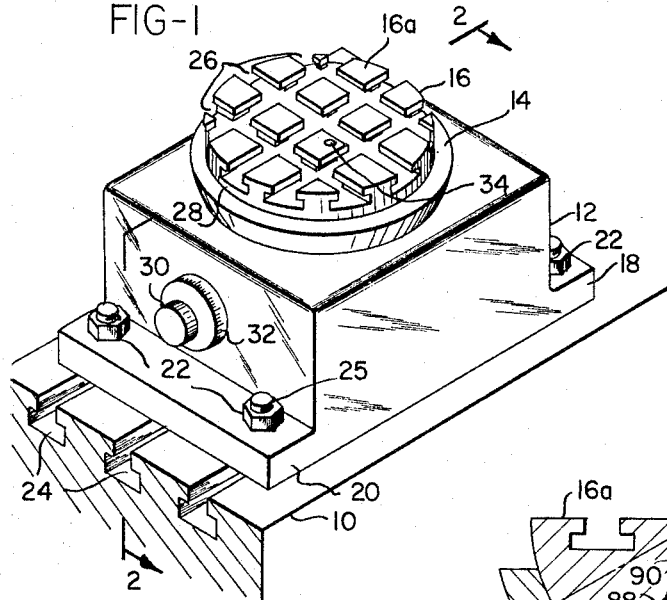
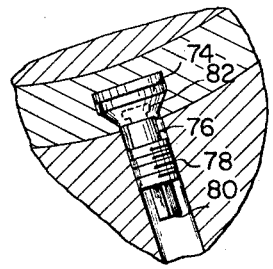
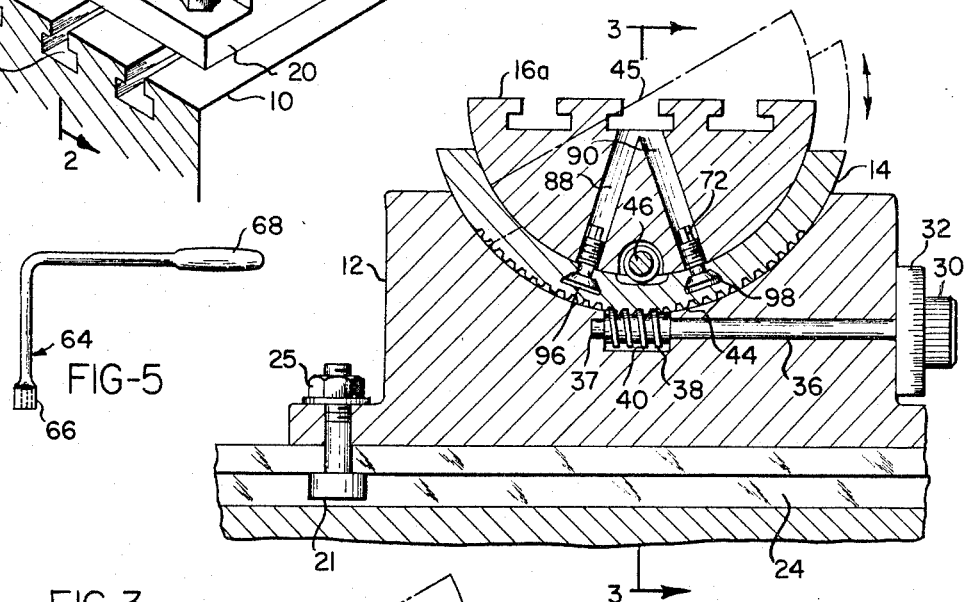
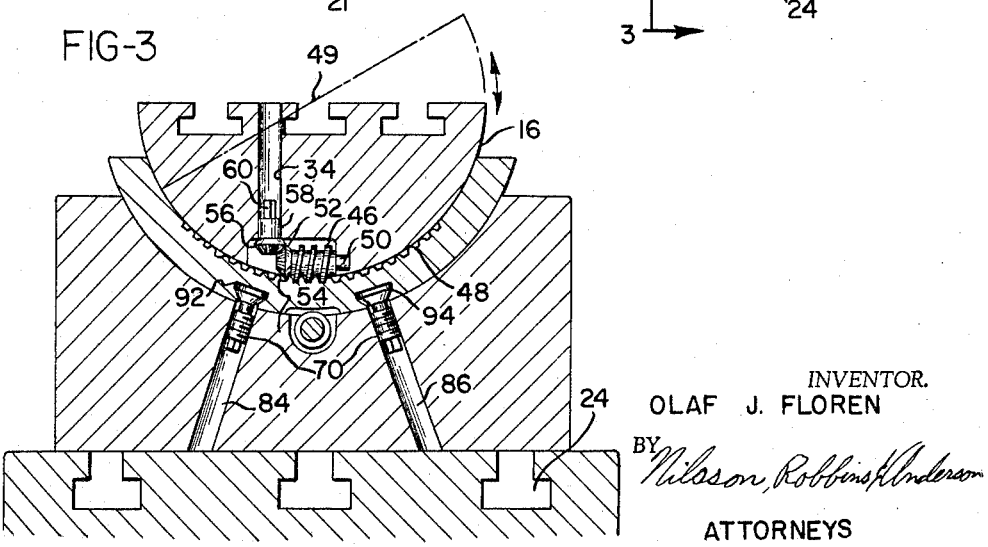
INVENTOR.
OLAF J. FLOREN
BY Nilsson, Robbins & Anderson
ATTORNEYS

United States Patent Office 3,273,879
Patented Sept. 20, 1966

3,273,879
COMPOUND SINE PLATE
Olaf J. Floren, 8331 West Ave., E–12,
Lancaster, Calif.
Filed Sept. 13, 1963, Ser. No. 308,891
6 Claims. (Cl. 269—61)

The present invention relates to a compound sine plate, and more specifically, to a work-piece plate or holder, which is universally tiltable to provide a support surface at various angles for machining operations, as facing, slotting, boring, and milling.

In a wide variety of equipment for shaping metal, a support or work table serves to hold a work-piece as it is machined. Specifically, for example, milling machines conventionally include a work table which moves in relation to a revolving cutter so as to acomplished various cuts in the work-piece.

In the operation of milling machines, a significant portion of the available production time is often spent mounting the work-piece on the supporting work table. This set-up time is usually increased considerably when the machine is used to cut a compound angle relative the surface upon which the work-piece is supported. That is, if the work-piece to be cut must be supported at a complex angle relative the support table, considerable time may be required to set up the work-piece and prepare for the actual cutting operation.

In making complex angular cuts, as considered above, various accessories as holders or sine plates have been used to hold a work-piece on a support table. Among the various types of sine plates in prior use are those which are tiltable about a single axis. However, workholders adjustable about a single axis are often difficult to use as they lack the flexibility to easily accommodate set-ups for compound angular cuts.

Various structures also have been proposed in the past which are adjustable about two axes in space quadrature to accommodate compound angular positioning; however, in general, such structures have not been sufficiently rigid for satisfactory use as a workpiece holder. That is, in the provision of gimbals or other prior double-axis structures, considerable difficulty arises in producing a structure sufficiently rigid to hold a work-piece while it is machined.

In general, the present invention comprises a universal sine plate for supporting a work-piece to be machined, at various angles relative a support table. A base block in the structure, having a concave surface supports a concave, convex shell that is tiltable about one axis. A hemispherical work support member lies in the concave-convex shell and is tiltable about an axis that is in space quadrature with the first axis. Means are also provided to set the components of the structure at various angles, and for locking the components in desired positions.

An object of the present invention is to provide an improved universal workholder for supporting a work-piece during various machining operations.

Another object of the present invention is to provide a compound sine plate that is rigid in construction and therefore stable during use, yet which is capable of precise and accurate operation in providing a variety of angularly-offset support surfaces.

Still another object of the present invention is to provide an improved universal workholder which may be relatively inexpensively manufactured, and which is sufficiently rugged to endure prolonged periods of use without damage.

These and other objects and advantages of the present invention will become apparent from a consideration of the following taken in conjunction with the appended drawing, wherein:

FIGURE 1 is a perspective view of a compound sine plate constructed in accordance with the present invention;
FIGURE 2 is a vertical sectional view taken along the line 2—2 of FIGURE 1;
FIGURE 3 is a vertical sectional view taken along line 3—3 of FIGURE 2;
FIGURE 4 is an enlarged fragmentary view of the structure shown in FIGURE 3; and
FIGURE 5 is a plan view of a tool useful in conjunction with the structure of FIGURE 1.

Referring initially to FIGURE 1, the disclosed embodiment of the present invention is shown mounted upon a work table 10 which may provide the support surface defining the work plane of a mililng machine, or various other equipment upon which a work-piece is placed during machining. A base block 12 of the workholder is affixed to the table 10 and contains a concave-convex shell 14 which in turn carries a hemispherical support member 16.

The shell 14 is tiltable relative the base block 12 about one axis while the support member 16 is tiltable relative the shell 14 about a quadrature-disposed axis. Therefore, by the combined tilting capabilities of the shell 14 and the support member 16, the flat surface 16a of the member 16 may be disposed at a wide variety of complex angles relative the surface of the work table 10.

Considering the structure in greater detail, the base block 12 may be of steel and have a generally-rectangular exterior configuration, with extending flanges 18 and 20. The flanges 18 and 20 each contain bores through which bolts 21 (anchored within T-slots 24 of the table 10) pass to receive nuts 25. Thus, the base block 12 is rigidly supported on the table 10, to in turn provide the tiltable support surface 16a.

The hemispherical member 16 and the shell 14 may also be formed of steel to mate in inter-dwelling relationship with the base block 12 affording the support surface 16a as the upper surface of the unit. The support surface 16a contains parallel T-slots 26 and 28. The slots 28 are transverse to the slots 26, with the result that the surface 16a incorporates a flexible arrangement for anchoring various work-pieces to that surface.

In setting the apparatus to support a work-piece, angular displacement about an axis parallel the T-slots 26 is accomplished by a knob 30 functioning in conjunction with a micrometer incorporating a dial 32 as well known in the gearing and metering arts.

The adjustment of the surface 16a about an axis parallel the T-slots 28 is accomplished by a wrench or adjustment tool (FIGURE 5) operating through a channel 34. Considering the adjusting structure further, reference will now be had to FIGURE 2 which shows the detailed structure to accomplish adjustment by the knob 30.

The knob 30 is coupled to a shaft 36 through the micrometer incorporating the dial 32. Adjacent the end 37 of the shaft 36, which end is journaled into an internal bore in the block 12, the shaft 36 carries a worm gear 38 contained in a generally cylindrical cavity 40. The worm gear 38 engages gear teeth 44 cut along a strip of the convex lower surface of the shell 14. Therefore, revolution of the shaft 36 turns the worm gear 38 to revolve the shell 14 about an axis 45 to the position as shown in phantom in FIGURE 2.

The movement of the support surface 16a about an axis 49 (FIGURE 3) lying in the same plane as the axis 45 and offset 90° therefrom, is accomplished by a worm gear 46 and mating gear teeth 48, lying along a strip on the upper concave surface of the shell 14.

The worm gear 46 is supported at one end by a stub shaft 50 journaled into an internal bore in the support member 16, and at the other end by engagement with a bevel gear 52. One wheel 54 of the bevel gear is affixed to the end of the worm gear 46 and engages a mating wheel 56 supported in a bearing 58 which is contained in the lower portion of the channel 34. Above the bearing 58, and integral with the bevel gear wheel 56 is a coupling 60 for engaging a wrench to revolve the gear wheel 56 which in turn functions through the bevel gear 52 to revolve the worm gear 46.

The worm gear 46 mates with the strip of gear teeth 48 contained on the concave surface of the shell 14, whereby to position the support member 16 about an axis 49 to locations as shown in phantom in FIGURE 3.

The revolution of the gear wheel 56 in the bevel gear 52 may be accomplished with the simple angle wrench 64 as shown in FIGURE 5, which has a coupling 66 to mate with the coupling 60, and a handle 68 by which the coupling may be revolved. Alternatively, sophisticated arrangements in corporating a micrometer may also be employed to revolve the gear wheel 56 and accomplish a predetermined angular displacement as desired.

When the surface 16a is oriented in the desired angle, the shell 14 and the work-supporting member 16 are locked in supporting position. This locking operation is accomplished by pairs of studs which are anchored in the shell 14 and extend respectively into the support member 16 and the base block 12. One pair of the studs 70 are shown in FIGURE 3 while the other pair of studs 72 are shown in FIGURE 2. The structure of these studs is similar and may be best considered with reference to the enlarged sectional view of FIGURE 4.

Each of the studs includes a frustum-shaped head 74 which is anchored for movement along an elongate arcuate channel in the shell 14. The head 74 is rotatably connected to a shaft 76 having an enlarged threaded section 78 mating with the internal threads of the containing passage, which threads facilitate movement of the shaft upon revolution thereof as by a wrench applied to the coupling 80. Revolution of the body of the stud relative its head is possible because the two parts are separate; however, they are joined by a flared shoulder 82 integral with the body which extends into the head.

The studs 70 as described with reference to FIGURE 4 are placed in partially-threaded passages 84 and 86 extending into the base block 12 from locations near the bottom of the concave cavity therein. Of course, only the upper portions of these passages need be threaded to receive the threaded sections 78 of the studs 70.

In a somewhat similar manner, the studs 72 are placed in partially-threaded passages 88 and 90 (FIGURE 2) through the support member 16. The passages 88 and 90 extend from the bottom of one of the T-slots 26 to the lower arcuate surface of the member 16. The heads of the studs 70 (FIGURE 3) lie in channels 92 and 94 while the heads of the studs 72 (FIGURE 2) lie in channels 96 and 98. The channels 92 and 94 are generally transverse the channels 96 and 98 so that during adjustment, the studs 70 travel in an arcuate path which is generally perpendicular the arcuate path traveled by the studs 72.

Considering the use of the apparatus disclosed herein, the first step is to establish and set the desired angular position of the support surface 16a. Therefore, assume, for example, that it is desired to accomplish a compound angular offset wherein the surface 16a is tilted 30 degrees on each of two perpendicular axes. To accomplish this setting, the wrench of FIGURE 5 is first coupled to the studs 70 individually through the passages 84 and 86 and the studs are turned deeper into the passages, thereby relieving the heads of the studs from binding contact with the interior of the channels 92 and 94. As a result, the knob 30 (FIGURE 2) may now be revolved to turn the worm gear 38 which in turn drives the shell 14 along with the support member 16 to an angularly-displaced position, for example, as shown in phantom in FIGURE 2.

With the shell 14 and the support member 16 at the desired angular displacement about the axis 45, the studs 70 are turned to be withdrawn from the passages 84 and 86, causing the heads of the studs to tightly lock with the channels 92 and 94, thereby locking the shell 14 to the base block 12.

Next, the wrench of FIGURE 5 is inserted through the passages 88 and 90 (FIGURE 2) of the hemispherical support member 16 to release that member from the shell 14 by turning the studs 72 more deeply into the passages 88 and 90 and relieving the contact between the heads of the studs and the channels 96 and 98. With the studs 72 so released, the worm gear 50 (FIGURE 3) is driven to angularly displace the support member 16 about the axis 49 to the desired degree (as shown in phantom in FIGURE 3).

Upon attaining the desired angular displacement about the axis 49, the studs 72 (FIGURE 2) are revolved to be withdrawn from the passages 88 and 90 thereby locking the heads of the studs with the channels 96 and 98. As a result, the shell 14 and the hemispherical member 16 are offset about one axis; while the hemispherical support member only is offset about the other axis. Thus, the desired compound angular offset assumed to be desired is accomplished. Therefore, the unit may be placed on the table 10 of a milling machine or other apparatus and locked by the nuts 22 and bolts 25 inserted through the base block 12 and received in the T-slots 24.

Thereafter, the work-piece (not shown) may be affixed to the support surface 16a by use of various locking devices in conjunction with the T-slots 26 and 28 with the result that the work-piece is supported upon an offset surface revolved about two axes.

It is to be understood that various forms of flex shafts may be employed in the structure of the present invention to provide adjustment members in desired locations on the support. However, the use of such flex shafts is well known in the prior art; therefore, the disclosure has been simplified by avoiding any detailed flex shaft structures.

In the course of functioning as a support apparatus, the structure of the present invention provides mating relationship between the solid components in three dimensions. That is, the apparatus of the present invention provides an extremely rigid support as a result of solid support for each of its components in all three dimensions.

Therefore, it will be apparent to those skilled in the art that the present invention provides a greatly improved and satisfactory workholder. Still further, it will be apparent that the structure is capable of many variations and modifications; consequently, the present invention is not to be limited to the particular arrangements herein shown and described except as defined by the appended claims.

What is claimed is:

1. A universal holder for supporting a work-piece during processing comprising: a base block defining a concave spherical surface; a concave-convex spherical shell mating in said concave spherical surface of said base block; means for clamping said shell to said base block in various locked positions of angular displacement of said shell about one axis of rotation; a first gearing means for driving said shell about said one axis of rotation; a spherically convex work-holder mating within the concave surface of said shell; means for clamping said work-holder to said shell in various locked positions of angular displacement about an other axis which is in space quadrature with said one axis; and a second gearing means for driving said work-holder about said other axis.

2. A universal holder for supporting a work-piece during processing comprising: a base block defining a concave spherical surface; a concave-convex spherical shell defining concave and convex surfaces and mating within said concave spherical surface of said base block; at least one first stud slidably affixed in an elongate channel defined in the convex surface of said shell and threadably engaged in said block whereby said shell may be clamped in locked engagement to said base block in various positions of angular displacement of said shell about one axis of rotation; a convex work-holder mating within said spherical shell; and at least one second stud fixed in an elongate channel defined in the concave surface of said shell and threadably engaged in said work-holder whereby said work-holder may be clamped in locked engagement to said shell in positions of angular displacement about another axis of rotation which is in space quadrature with said one axis.

3. A universally-adjustable holder, as for supporting a workpiece on a machine table, as during machine-cutting processes, comprising:
   a base block adapted to be affixed to said machine table and defining a concave spherical opening;
   a spherically concave convex shell matingly received in said concave spherical opening of said base block;
   a spherically convex work-holder matingly received in said spherically concave convex shell and including means for engageably receiving said workpiece;
   first clamp means for locking said shell to said block in any of a variety of positions, in each of which, said shell is variously displaced about a first central axis of rotation thereof; and
   second clamp means for locking said work-holder to said shell in any of a variety of positions, in each of which, said work-holder is variously displaced about a second central axis that is in space quadrature to said first central axis.

4. A universally-adjustable holder, as for supporting a workpiece on a machine table, as during machine cutting processes, comprising:
   a base block adapted to be affixed to said machine table and defining a concave spherical opening;
   a spherically concave convex shell matingly received in said concave spherical opening of said base block;
   a spherically convex work-holder matingly received in said spherically concave convex shell and including means for engageably receiving said workpiece;
   first clamp means for locking said shell to said block in any of a variety of positions in each of which, said shell is variously displaced about a first central axis of rotation thereof;
   first drive gear means rotatable to positively displace said shell to said variety of positions;
   second clamp means for locking said work-holder to said shell in any of a variety of positions, in each of which, said work-holder is variously displaced about a second central axis that is in space quadrature to said first central axis; and
   second drive gear means rotatable to positively displace said work-holder to said variety of positions.

5. A holder as defined in claim 4 wherein said first and second clamp means comprise locking studs affixed in elongate channels defined in said shell and threadably engaged to said base block and said work-holder.

6. A holder as defined in claim 4 wherein said work-holder is of substantially hemispherical configuration.

References Cited by the Examiner

UNITED STATES PATENTS

| | | | |
|---|---|---|---|
| 1,292,235 | 1/1919 | Beckett | 269—71 X |
| 2,378,912 | 6/1945 | Collins | 269—61 |
| 2,521,231 | 9/1950 | Larson | 269—76 X |
| 3,053,557 | 9/1962 | Beyer et al. | 269—76 X |

ROBERT C. RIORDON, *Primary Examiner.*

R. J. BUENZLE, B. S. MOWRY, *Assistant Examiners.*